Inventor:
RONALD ROSENZWEIG
BY Dean W Chace
Attorney

SEMICONDUCTOR DEVICES AND METHODS OF MAKING THEM

Filed Dec. 1, 1966 Sheet 2 of 2

Inventor:
RONALD ROSENZWEIG
By Dean W Chace
Attorney

United States Patent Office 3,432,920

Patented Mar. 18, 1969

3,432,920

SEMICONDUCTOR DEVICES AND METHODS OF MAKING THEM

Ronald Rosenzweig, New York, N.Y., assignor to Radio Corporation of America, a corporation of Delaware Filed Dec. 1, 1966, Ser. No. 598,306

U.S. Cl. 29—578 7 Claims

Int. Cl. B01j *17/00;* H01l *5/00, 7/00*

ABSTRACT OF THE DISCLOSURE

In the fabrication of semiconductor devices, an insulating layer having a variable thickness is provided on the surface of a semiconductor wafer. An opening through a thin portion of the layer and a recess in a thick portion of the layer are simultaneously etched. The first opening is closed and, thereafter, a second opening is made through the thin portion and at the same time an opening is made from the bottom of the recess through the thick portion.

This invention relates to improved semiconductor devices such as transistors or integrated circuits, and to improve methods for making semiconductor devices with improved yields without degrading electrical performance.

The economics of semiconductor manufacturing is dependent on the yields obtained during the manufacturing process. That is, the average cost of each device is directly related to the number of devices which survive a given number of starts during each individual manufacturing step. High survival rates or yields provide low costs and low yields can make the total cost of finished devices prohibitive.

One of the chief causes of poor manufacturing yields of semiconductor devices is defects—tiny holes, for example, in the photoresist film which is used to define patterns photographically on the surface of the semiconductor. These defects are caused by such things as faults in the photomasks that are placed on top of the film prior to exposure of the film. A tiny protrusion on the mask, for example, can create an equally small, but nevertheless disastrous hole in the film. Dust can also cause pinholes in the film. These pinholes in the film will cause unwanted pinholes to be etched in the insulating layer that protects the surface of the semiconductor. Thus, the silicon surface is exposed with the result that, later in the processing, during metallization, metal passes over the pinholes and contacts the semiconductor surface, thereby creating an electrical short circuit and running the device.

Many techniques have been developed in the semiconductor industry for minimizing the incidence of pinholes. These include such things as the reduction of dust and improvements in the surface of the photomasks. Nevertheless, even under the best operating conditions and using all known precautions, the pinhole density rarely decreases below 20 pinholes per square centimeter and is generally much greater.

It is therefore an object of this invention to provide improved semiconductor devices which are capable of being fabricated with improved yields.

It is another object of this invention to provide improved semiconductor devices capable of low cost manufacture without degrading electrical performance.

It is still another object of this invention to provide an improved method of making semiconductor devices wherein the deleterious effects of pinholes in the photoresist films used to make the devices are minimized.

These objects are achieved by the use of differential heights of the insulating layer that protects the surface of the semiconductive body from which, for example, a transistor or integrated circuit is fabricated. These heights are selected so that pinholes which may exist in the photoresist film are not permitted to penetrate the insulating layer to the surface of the semiconductive body during etching. To this end, the etching of openings in the insulating layer for making contact to two discrete areas or regions of the device, such as a pair of electrodes, is done simultaneously and for a controlled amount of time.

The invention is described in greater detail by consideration of the following description of three examples of the invention considered in connection with the drawing, in which.

*Example 1*

Figures 1, 2, 3, 4, 5, 6, 7, 8, 9, 10, 11:
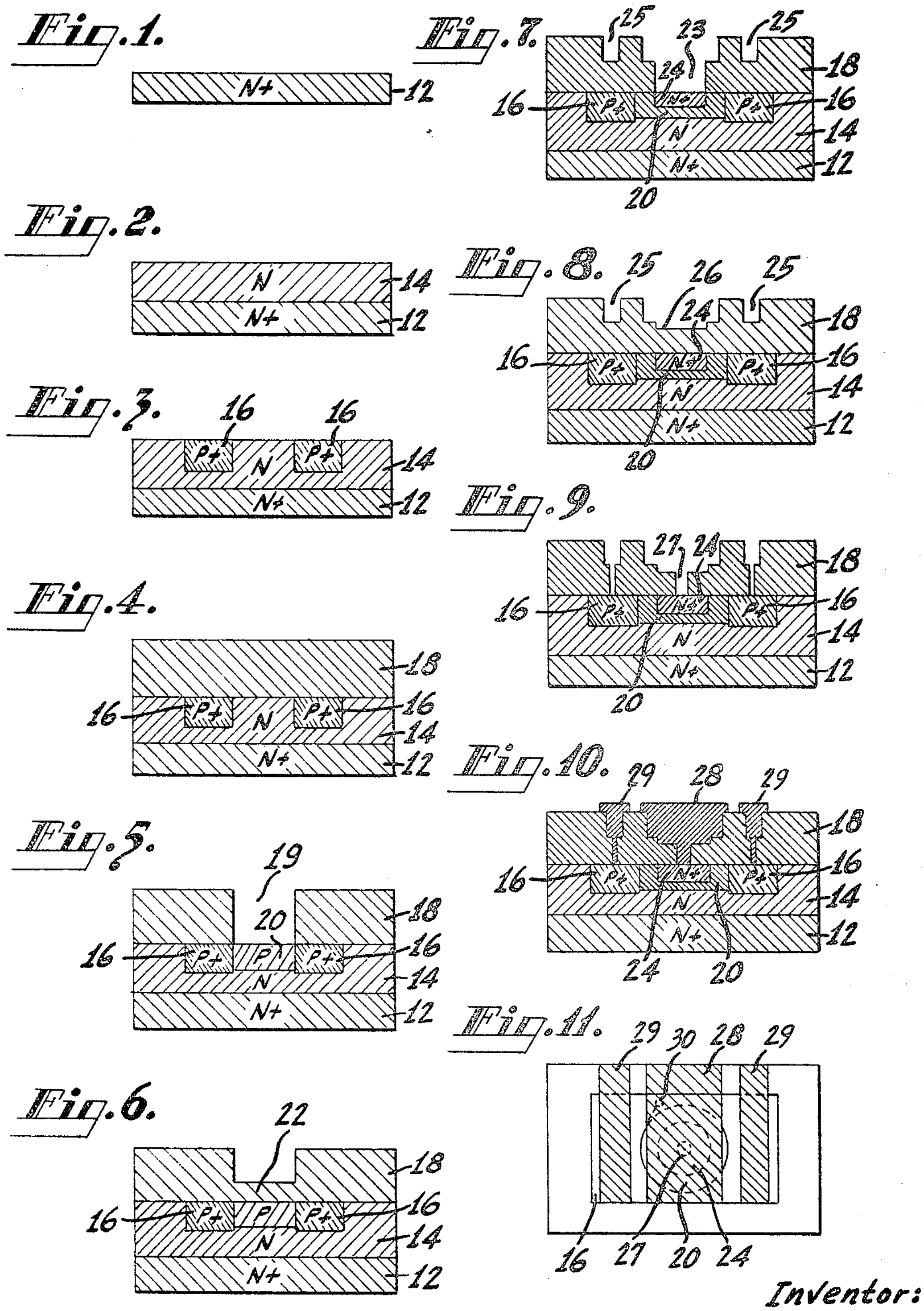
FIGURES 1 to 10 are sectional views of an improved transistor embodying the invention during the various stages of its manufacture.
FIGURE 11 is a top view of the transistor illustrated in FIGURE 10.
Figure 12:
FIGURES 12 to 20 are sectional views of a second type transistor, also embodying the invention, during the various stages of its manufacture.
Figure 13:
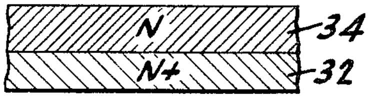

Transistors embodying this invention may be fabricated using planar batch processing techniques whereby hundreds of transistors may be manufactured simultaneously on a single wafer of silicon and later scribed, mounted, and assembled in individual enclosures or packages. For purposes of simplifying the description of the invention, however, the fabrication of a single transistor will be discussed.

The starting material is a body 12 (FIGURE 1) of semiconducting single crystal silicon of N+ conductivity. Super-imposed on the body 12 is an epitaxial layer 14 (FIGURE 2) of N type silicon which serves, together with the N+ layer 12, as the collector of the transistor. Alternatively, diffusion techniques can be used instead of using epitaxial layers. For example, an N type semiconductive body 14 of single crystal silicon can be the starting material and the N+ layer 12 can be diffused into the body 14. The epitaxial layer 14 may have a thickness, for example, of 1.0 mil which is exaggerated in the drawing for the sake of facilitating the description of the invention. It should be understood that none of the dimensions of the drawing are to scale.

By using well-known masking and photolithographic techniques, a highly-conductive diffused base region 16 of P+ type conductivity is fabricated into the epitaxial layer 14 as illustrated in FIGURE 3. This may be accomplished by diffusing suitable P type dopants, such as boron, from sources such as boron trioxide or boron tribromide into the epitaxial layer 14. As shown in FIGURE 11 the P+ base region 16 may be defined by a rectangular outer periphery and a circular inner periphery.

Upon completion of the P+ base diffusion, a thick layer of silicon oxide 18 or other suitable insulator, such as silicon nitride, is placed over the surface of the epitaxial layer 14 as illustrated in FIGURE 4. The oxide layer 18 is deliberately made thick for reasons that will become apparent later. This oxide layer 18 may, for example, be fabricated in two steps. First, a layer approximately 4000 A. thick may be grown on the surface thermally by heating the semiconductive body in steam for about 20 minutes at approximately 1200° C. Next, a 10,000 A. thick layer may be deposited by passing a mixture of silane gas ($SiH_4$) and oxygen over the body at low temperature (about 300° C.).

Next, an opening 19 is etched into the oxide layer 18 by suitable and well-known masking and photoresist techniques as illustrated in FIGURE 5. This opening 19 defines the remainder of the base region 20 of the transistor, which is fabricated by diffusing in a suitable P type dopant through the opening 19. Upon completion of the P base diffusion, the exposed surface of the body is oxidized to provide a layer 22 of oxide (FIGURE 6) or other suitable insulator over the base region 20. This layer 22 is considerably thinner than the original oxide layer 18, typically being 4000 A. thick to provide a height differential between the two insulating layers. In the present example, this differential is 10,000 A. The insulating oxide layer 22 is made by heating the body in steam for about 20 minutes at 1000° C.

The next step in the fabrication of the transistor is to define the emitter region, the base and collector regions having been defined previously as described in connection with FIGURES 1 to 6. To this end, a suitable photomask is used which contains the desired pattern for the emitter. This photomask also contains openings over the P+ base region of the transistor. Thus, by the use of well-known photolithographic techniques and by applying a suitable etch to the body, a pattern is defined in the oxide layer 18 as illustrated in FIGURE 7. This pattern includes a circular opening 23 above the P base region 20 for diffusing in an emitter region 24 and elongated indentations or slots 25 above the P+ base region 16. In this manner, the thick (14,000 A.) oxide over the P+ region 16 is reduced in thickness to around 8000 A. over the region where the P+ base contact will be later made.

After etching, the N+ emitter region 24 is diffused into P base region 20 by introduction of suitable N type dopants through the opening 23. Following the emitter diffusion, a thin oxide or other suitable insulating layer 26 is thermally grown over the exposed emitter 24 by heating the body in steam for about 20 minutes at approximately 1200° C. to provide the structure shown in FIGURE 8.

Masking and photolithographic techniques are then used to etch away the insulating layer 26 to define a circular contact opening 27 (FIGURE 9) for the center of the emitter 24. At the same time, the region under the indentations 25 in the insulating layer 18 (about 8000 A. thick) is etched to define elongated contact openings for the P+ region 16 of the base. At this stage in the processing, by having provided the differential oxide heights and by limiting the etch time to that required to etch through the thinner insulator which covers the P+ base region 16, the penetration of harmful pinholes through the thicker oxide to the semiconductor surface is minimized.

As a final step in the fabrication of a transistor embodying the invention, contact is made to the P+ base 16 and emitter 24 regions by vacuum evaporating and depositing an aluminum or other conductive metal layer over the entire top surface of the device. The desired pattern is then defined on the top surface of the aluminum layer and the unwanted portions are etched away to leave a conductive metal pattern of the type shown in FIGURE 10. In this manner, an electrical contact 28 is made to the center of the emitter region 24 and an electrical contact 29 is made to the P+ base region 16. The top surface of these metal contacts are in the form of pads to which contact may be made with fine conducting wires, for example. The device is then mounted in a suitable enclosure and encapsulated by any one of several techniques well known in the semiconductor art.

A top view of the completed transistor is illustrated in FIGURE 11, which shows the conducting metal contacts 28 and 29 making contact respectively to the emitter 24 at the contact opening 27 and to the P+ base region 16. Any pinhole on the surface of the oxide coating 18 in the region under the emitter contact 28 and over the P base region 20 would, in prior art devices, normally be etched through to the surface of the semiconductor. As an example, a pinhole 30, which might be one of many in the surface, is illustrated in FIGURE 11. If this pinhole is permitted to penetrate through the insulator coating 18 to the surface of the semiconductor, it will create a direct electrical short between the emitter region 24 and the P+ base region 16 once the conducting layer 28 is evaporated onto the surface of the device. That is, the evaporated metal would penetrate through the insulating layer 18 to the P+ base region since the metal layer 28 covers both the emitter and base region. Because, however, of the differential insulating layer heights which are provided in the improved transistor, pinholes are limited in the depth that they are able to penetrate the layer 18 and do not, in any case, penetrate to the electrodes of the device. Thus, unwanted electrical shorting of the electrodes is prevented. In actual tests, a two-fold increase in base-emitter yields has been observed when the teachings of this invention have been practiced.

The invention has thus far been described in connection with a single bipolar transistor having one collector, one emitter, and one base electrode. However, it is applicable equally to transistors having multiple emitters, for example of the overlay type, suitable for high frequency-high power operation specifically. It is equally applicable to other classes of devices, such as field effect devices and to devices of an opposite type conductivity to the type conductivity illustrated in the drawing.

*Example II*

An example of a high frequency multiple emitter device of the overlay type which embodies the teachings of this invention is illustrated in FIGURES 12 to 20, reference to which is now made. For purposes of simplifying the description, the fabrication of a portion of a multiple emitter transistor will be discussed. The starting material is a body 32 (FIGURE 12) of semiconducting single crystal silicon of N+ conductivity having a resistivity of about 0.01 ohm cm. and a thickness of 6 to 8 mils. The body 32 will later serve as the collector region of the complete transistor. Superimposed on the body 32 is an epitaxial layer 34 (FIGURE 13) of N type silicon having a resistivity of approximately 2 to 3 ohm cm. The layer 34 could also be diffused into the body 32. The epitaxial layer 34 would have a thickness, for example, of 1.0 mil which is exaggerated in the drawing for the sake of facilitating the description of the invention.

Figure 14:
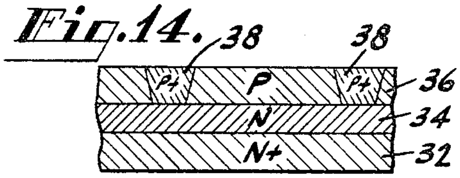

By using well-known masking and photolithographic techniques, a rectangular-shaped diffused base region 36 of P type conductivity is fabricated into the epitaxial layer 34 as illustrated in FIGURE 14. This may be accomplished by diffusing suitable P type dopants, such as boron, from sources such as boron trioxide or boron tribromide into the epitaxial layer 34 at a temperature of 800° to 920° C. for 30 minutes, then at 1200° C. for an additional 30 minutes. The region 36 could also be a second epitaxial layer.

The base also includes a separate region 38 of P+ conductivity. This P+ region 38 has a sheet resistance of about 1 ohm per square and is made by diffusing in a suitable P type dopant, such as boron, from a source such as boron trioxide or boron tribromide, for example, at 1150° C. for 15 minutes.

Figure 15:
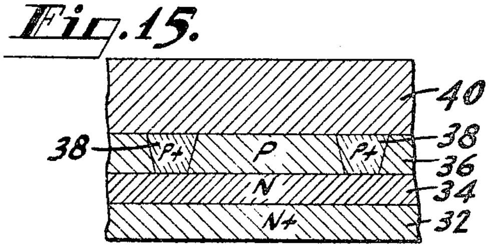
Figure 16:
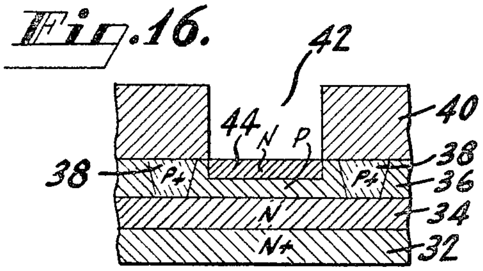
Figure 17:
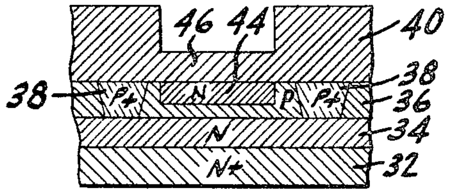

Upon completion of the P and P+ base diffusions, a thick layer of silicon oxide 40 or other suitable insulator, such as silicon nitride, is placed over the surface as illustrated in FIGURE 15. As in the first example, the oxide layer 40 is deliberately made thick and may, for example, be fabricated in two steps. First, a layer approximately 4000 A. thick may be grown on the surface thermally by heating the semiconductive body in steam for about 20 minutes at approximately 1200° C. Next, a 10,000 A. thick layer may be deposited by passing a mixture of silane gas ($SiH_4$) and oxygen over the body at low temperature (about 300° C.). An opening 42 is then etched into the oxide layer 40 by suitable and well-known masking and photoresist techniques as illustrated in FIGURE 16. This opening 42 defines a resistor pattern for the device.

An emitter resistor 44 is fabricated in the epitaxial layer to a depth of about 0.03 to 0.04 mil by diffusing in a suitable N type dopant such as phosphorus. The emitter resistor 44 is designed to have a sheet resistance of from 2 to 100 ohms per square. To this end, it may be fabricated by diffusing in, through the opening 42, phosphorus oxychloride ($POCl_3$) at 900° C. for 35 minutes. The emitter resistor 44 typically may be 2.5 mils in diameter.

Upon completion of the resistor diffusion, the exposed surface of the body is oxidized to provide a relatively thin layer 46 of oxide or other suitable insulator over the resistor 44. This layer 46 is considerably thinner than the original oxide layer 40, typically being 4000 A. thick to provide a height differential between the two insulating layers. In the present example, this differential is 10,000 A. The insulating oxide layer 46 is made by heating the body in steam for about 20 minutes at 1000° C.

Figure 18:
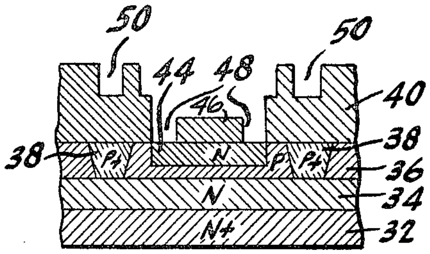
Figure 19:
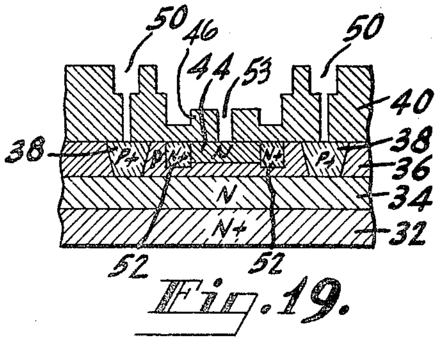

The next step in the fabrication of the transistor is to define the emitter region, the base and collector regions having been defined previously as described in connection with FIGURES 12 to 17. To this end, a suitable photomask is used which contains the desired pattern for the emitter. This photomask also contains a pattern for the base contact of the transistor. Thus, by the use of well-known photolithographic techniques and by applying a suitable etch to the body, a pattern is defined in the oxide layer 40 as illustrated in FIGURE 18. This pattern includes openings 48 for diffusing in the emitter region and indentations 50 above the P+ base region 38. Since the outer edge of the emitter region is defined by the resistor region 44, it is only necessary to etch through the thin (4000 A.) oxide layer over the resistor 44. At the same time this is being done, the thick (14,000 A.) oxide over the P+ region 38 is being etched to reduce the oxide thickness to around 8000 A. (indentations 50) over the region where the base contact will be later made.

After etching, an N+ emitter region 52 (FIGURE 19) is diffused into the epitaxial layer 34 by introduction of suitable N type dopants through the openings 48. The emitter 52 has an outer diameter, for example, of 2.5 mils and is diffused into a depth of approximately 0.05 to 0.06 mil. The emitter 52 thus extends somewhat deeper and is doped heavier than its associated resistor region 44. The emitter 52 may be made by diffusing phosphorus oxychloride into the epitaxial layer at 1025° C. for 16 minutes. Following the emitter diffusion, a thin oxide or other suitable insulating layer is thermally grown over the exposed emitter 52 by heating the body in steam for about 20 minutes at approximately 1200° C.

Masking and photolithographic techniques are then used to etch away a portion of the insulating layer 46 to define a contact opening 53 for the center of the emitter resistor 44. At the same time, the regions under the indentations 50 in the insulating layer 40 (about 8000 A. thick) are etched to define contact openings for the P+ region 38 of the base. At this stage in the processing, by providing the differential oxide heights, the oxide height over the emiter resistor 44 is 5000 A. thick, and the height of the insulator over the base 36 is 14,000 A. thick. By limiting the etch time, therefore, to that required to etch through the approximately 8000 A. thick insulator which covers the P+ base region, the penetration of harmful pinholes to the semiconductor surface can be eliminated. As illustrated, an insulating layer thickness of approximately 6000 A. remains, in the worst case, to protect shorting of the emitter 52 to the base 36 after metallizing is completed.

Figure 20:
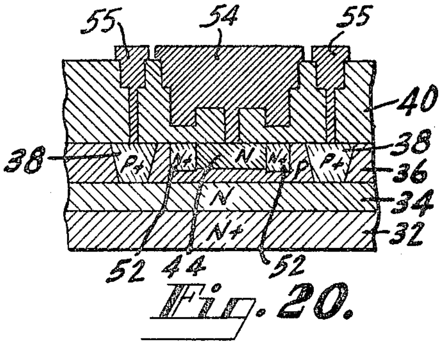

As a final step in the fabrication of a transistor embodying the invention, contact is made to the base and emitter regions by vacuum evaporating and depositing an aluminum or other conductive metal layer, which is defined by photolithographic techniques, over the device as shown in FIGURE 20. In this manner, a metallic electrical contact 54 is made to the center of the emitter resistor region 44 and a contact 55 is made to the P+ base region 38. By practicing this invention, moreover, the metal which is deposited does not pass through pinholes to the electrodes of the device. Thus, unwanted short circuits are eliminated minimized and the device yields are improved (by as much as 2:1 in actual tests). The device is then mounted in a suitable enclosure and encapsulated by any one of several techniques well known in the semiconductor art.

The transistor illustrated in FIGURES 12 to 20 contains a single emitter and base electrode for the sake of simplifying the description of the invention. However, in actual practice the transistor may contain a number of interconnected emitters and multiple base electrodes, such that it would be suitable for high frequency-high power operation.

Improved semiconductor devices have been described which can be made with greatly improved yields with an attendant saving in manufacturing costs. These advantages are achieved without the sacrifice of circuit performance. The beneficial results achieved, moreover, do not require any extra manufacturing steps.

What is claimed is:

1. In the method of fabricating a semiconductor device the steps of:

(a) providing an insulating coating over a surface of a semiconductive body, said coating having a relatively thick portion and a relatively thin portion;

(b) simultaneously etching a first opening completely through said thin portion and a recess part away through said thick portion;

(c) recovering the portion of said body exposed by said first opening with a new coating of insulating material;

(d) simultaneously etching a second opening completely through said new coating and a third opening completely through said thick portion from the bottom of said recess; and (e) disposing spaced apart deposits of conductive material in said second and third openings respectively to make contact with the portions of said body exposed by said second and third openings.

2. In the method of fabricating a semiconductor device the steps of:

(a) providing an insulating coating over a surface of a semiconductive body, said coating having a relatively thick portion over a first region of said body and a relatively thin portion over a second region of said body;

(b) simultaneously etching a first opening completely through said thin portion to expose a portion of said second region and a recess partially through said thick portion in a direction toward said first region;

(c) recovering the portion of said second region exposed by said first opening with a new coating of insulating material;

(d) simultaneously etching a second opening completely through said new coating to expose a portion of said second region and a third opening from the bottom of said recess to expose a portion of said first region; and (e) disposing conductive material in said second opening to make contact with the exposed portion of said second region and in said third opening to make contact with the exposed portion of said first region, the contact-making conductive material of said second region extending out of said second opening and onto said thick portion in overlying insulated relationship with a portion of said first region.

3. In the method of fabricating a semiconductor device the steps of:

(a) providing an insulating coating over a surface of a semiconductive body, said coating having a relatively thick portion over a first electrode region of said body and a relatively thin portion over a second region of said body;

(b) simultaneously etching a first opening completely through said thin portion to expose a portion of said second electrode region and a recess partially through said thick portion in a direction toward said first electrode region;

(c) diffusing dopants through said first opening to provide a second electrode region in said body;

(d) recovering the portion of said second electrode region exposed by said first opening with a new coating of insulating material;

(e) simultaneously etching a second opening completely through said new coating to expose a portion of said second electrode region and a third opening from the bottom of said recess the remainder of the way through said thick portion to expose a first portion of said first electrode region; and (f) disposing conductive material in said second opening to make contact with the exposed portion of said second electrode region and in said third opening to make contact with the exposed first portion of said first electrode region, the contact-making conductive material of said second region extending out of said second opening and onto said thick portion in overlying insulated relationship with a second portion of said first electrode region.

4. In a method for fabricating a semiconductor device including a semiconductive body, the steps comprising:

(a) providing first and second electrode regions in said body;

(b) covering the top surface of said body with a relatively thick coating of insulating material;

(c) providing an opening in said coating extending to the top surface of said semiconductive body and simultaneously providing a recess partially through said coating in a direction toward one of said electrode regions;

(d) providing a third electrode region in said semiconductive body by the selective diffusion of impurities through said first-named opening;

(e) providing an insulating coating over said first-named opening of a height less than said thick coating;

(f) providing openings simultaneously in said insulating coating extending to the top surface of one of said first and second electrode regions and to the top surface of said third electrode region by the selective etching of said thick coating; and (g) providing a conductive metal contact through said openings to said one electrode region and to said third electrode region.

5. In the method of fabricating a semiconductor device the steps of:

(a) providing an insulating coating on the surface of a semiconductive body, said coating being thinner at a first location on said body than it is at a second location on said body;

(b) selectively etching said insulating coating for a period of time sufficient to provide an opening therethrough only at said first location and partially therethrough at said second location;

(c) recoating said body with a second insulating coating at said first location;

(d) etching said coatings for a period of time sufficient to provide openings completely therethrough to expose portions of said body at both of said first and second locations; and (e) applying conductive contact-making material into said openings.

6. In the method of fabricating a semiconductor device the steps of:

(a) providing an insulating coating on the surface of a semiconductive body, said coating being thinner at a first location on said body than it is at a second location on said body;

(b) applying a first etch resistant coating over said insulating coating, said first etch resistant coating having apertures therein at said first and second locations;

(c) etching said insulating coating for a period of time sufficient to provide an opening therethrough only at said first location and partially therethrough at said second location;

(d) removing said first etch resistant coating and recoating said body with a second insulating coating at said first location;

(e) applying a second etch resistant coating over said insulating coatings, said second etch resistant coating having apertures therein at said first and second locations;

(f) etching said insulating coatings for a period of time sufficient to provide openings completely therethrough to expose portions of said body at both of said first and second locations; and (g) applying conductive contact-making material into said openings and onto said relatively thick insulating coating in pads extending respectively from said first and second locations toward an edge of said body.

7. In the method of fabricating a semiconductor device the steps of:

(a) providing an insulating coating on the surface of a semiconductive body;

(b) selectively treating said insulating coating for a period of time sufficient to provide an opening therethrough at a first location and partially therethrough at a second location;

(c) recoating said body with a second insulating coating at said first location; and (d) treating said coatings for a period of time sufficient to provide openings completely therethrough at said first and second locations to expose portions of said body at both of said first and second locations.

References Cited

UNITED STATES PATENTS

| | | | |
|---|---|---|---|
| 3,178,804 | 4/1965 | Ullery et al. | |
| 3,184,329 | 5/1965 | Burns. | |
| 3,212,162 | 10/1965 | Moore | 29—578 |

WILLIAM I. BROOKS, *Primary Examiner.*

U.S. Cl. X.R.

29—589; 117—212; 148—187; 156—8